(12) United States Patent
Shin et al.

(10) Patent No.: US 11,450,910 B2
(45) Date of Patent: Sep. 20, 2022

(54) SECONDARY BATTERY AND INSULATOR FOR SECONDARY BATTERY

(71) Applicant: LG CHEM, LTD., Seoul (KR)

(72) Inventors: Hang Soo Shin, Daejeon (KR); Do Gyun Kim, Daejeon (KR); Sang Suk Jung, Daejeon (KR); Byoung Gu Lee, Daejeon (KR); Chan Bae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 56 days.

(21) Appl. No.: 16/499,989

(22) PCT Filed: Oct. 17, 2018

(86) PCT No.: PCT/KR2018/012303
§ 371 (c)(1),
(2) Date: Oct. 1, 2019

(87) PCT Pub. No.: WO2019/088524
PCT Pub. Date: May 9, 2019

(65) Prior Publication Data
US 2020/0106060 A1    Apr. 2, 2020

(30) Foreign Application Priority Data
Nov. 1, 2017  (KR) .................. 10-2017-0144795

(51) Int. Cl.
H01M 50/116    (2021.01)
H01M 10/0587   (2010.01)
H01M 50/147    (2021.01)

(52) U.S. Cl.
CPC ..... *H01M 50/116* (2021.01); *H01M 10/0587* (2013.01); *H01M 50/147* (2021.01)

(58) Field of Classification Search
CPC .. H01M 10/00; H01M 50/00; H01M 10/0587; H01M 50/147
See application file for complete search history.

(56) References Cited

U.S. PATENT DOCUMENTS

2004/0121229 A1   6/2004   Kim et al.
2007/0154804 A1   7/2007   Kim et al.
(Continued)

FOREIGN PATENT DOCUMENTS

CN    1495932 A       5/2004
CN    204749409 U  *  11/2015
(Continued)

OTHER PUBLICATIONS

EPO machine translation of JP 2002231314 originally published to Yokoyama Takashi on Aug. 16, 2002 (Year: 2002).*
(Continued)

*Primary Examiner* — Cynthia H Kelly
*Assistant Examiner* — Niara Trant
(74) *Attorney, Agent, or Firm* — Morgan, Lewis & Bockius LLP

(57) ABSTRACT

A secondary battery may include: an electrode assembly in which a positive electrode, a negative electrode, and a separator are wound or stacked; an insulator on at least one of an upper portion and a lower portion of the electrode assembly; and a battery case configured to accommodate the electrode assembly, the insulator, and an electrolyte and sealed by a cap assembly, wherein the insulator includes: a peripheral portion having a disk ring shape and made of a rigid material; and a central portion extending inward from an inner circumferential surface of the peripheral portion and including a textile fabric having high-temperature resistance.

12 Claims, 6 Drawing Sheets

(56) References Cited

U.S. PATENT DOCUMENTS

2009/0123835 A1    5/2009    Kim et al.
2018/0123163 A1    5/2018    Park et al.
2020/0013998 A1    1/2020    Shin et al.

FOREIGN PATENT DOCUMENTS

| | | |
|---|---|---|
| JP | 2000-348771 A | 12/2000 |
| JP | 2002-231314 A | 8/2002 |
| JP | 2008-027635 A | 2/2008 |
| JP | 2013-073873 A | 4/2013 |
| JP | 2013-131430 A | 7/2013 |
| JP | 2020-513482 A | 5/2020 |
| KR | 10-2007-0071236 A | 7/2007 |
| KR | 10-0839784 B1 | 6/2008 |
| KR | 2017-0012090 A | 2/2017 |

OTHER PUBLICATIONS

EPO machine translation of JP 2008027635 originally published to Ueda Tomomichi on Feb. 7, 2008 (Year: 2008).*

EPO machine translation of JP-2013131430-A originally published to Sato Toshitada on Jul. 4, 2013 (Year: 2013).*

English Machine translation of CN 204749409 originally published to Zhang Yujiang on Nov. 11, 2015 (Year: 2015).*

Extended European Search Report dated May 25, 2020, issued in corresponding European Patent Application No. 18874533.5. Note: JP 2008-027635, JP 2002-231314, and JP 2013-131430 cited therein are already of record.

"Fiberglass Base of Flap Wheel",www.cndahua.com/products, Jul. 30, 2017, XP055693889.

Office Action dated Nov. 17, 2020, issued in corresponding Japanese Patent Application No. 2019-565218. Note: JP 2013-131430 and JP 2008-027635 cited therein are already of record.

International Search Report dated Jan. 23, 2019 issued in corresponding International Patent Application No. PCT/KR2018/012303.

Office Action dated Aug. 8, 2020, issued in corresponding Korean Patent Application No. 10-2017-0144795. Note: JP 2002-231314 and JP 2013-131430 cited therein are already of record.

Office Action dated Nov. 17, 2020, issued in corresponding Japanese Patent Application No. 2019-565218. Note: JP 2002-231314, JP 2013-131430, and JP 2008-027635 cited therein are already of record.

Office Action dated Aug. 31, 2021, issued in corresponding Chinese Patent Application No. 201880021442.0 Note: JP 2002-231314, JP 2013-131430, and JP 2008-027635 cited therein are already of record.

* cited by examiner

SECONDARY BATTERY AND INSULATOR FOR SECONDARY BATTERY

CROSS-REFERENCE TO RELATED APPLICATION

The present application claims the benefit of the priority of Korean Patent Application No. 10-2017-0144795, filed on Nov. 1, 2017, which is hereby incorporated by reference in its entirety.

TECHNICAL FIELD

The present invention relates to a secondary battery and an insulator for the secondary battery, and more particularly, to a secondary battery in which an electrolyte is easily injected into a battery can, and an internal structure of the battery is not exposed to air to prevent oxidation of an electrode and deterioration of the electrolyte from occurring and an insulator for the secondary battery.

BACKGROUND ART

Batteries (cells) that generate electric energy through physical or chemical reaction to supply the generated electric energy to the outside are used when AC power to be supplied to the building is not obtained, or DC power is required according to the living environments surrounded by various electronic devices.

Among such batteries, primary batteries and secondary batteries, which are chemical cells using chemical reaction, are generally used. The primary batteries are consumable cells which are collectively referred to as dry cells. On the other hand, a secondary battery is a rechargeable battery that is manufactured by using a material in which oxidation and reduction processes between current and a material are capable of being repeated many times. That is, when the reduction reaction to the material is performed by the current, power is charged. When the oxidation reaction to the material is performed by the current, power is discharged. Such charging-discharging are repeatedly performed to generate electricity.

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

A lithium secondary battery is generally formed by laminating a positive electrode (i.e., cathode), a separator, and a negative electrode (i.e., anode). Also, materials of the positive electrode, the separator, and the negative electrode may be selected in consideration of battery lifespan, charging/discharging capacities, temperature characteristics, stability, and the like. The charging and discharging of the lithium secondary battery are performed while lithium ions are intercalated and deintercalated from lithium metal oxide of the positive electrode to a graphite electrode of the negative electrode.

In general, unit cells, each of which has a three-layered structure of a positive electrode/a separator/a negative electrode or a five-layered structure of a positive electrode/a separator/a negative electrode/a separator/a positive electrode or a negative electrode/a separator/a positive electrode/a separator/a negative electrode, are assembled to constitute one electrode assembly. The electrode assembly may be classified into a jelly-roll type in which a separator is disposed between a positive electrode and a negative electrode, each of which has a long sheet shape and is coated with an active material, and a stack type in which a plurality of positive electrodes and negative electrodes, each of which has a predetermined size, are sequentially stacked with separators therebetween. The electrode assembly is accommodated in a specific case.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material having a variable shape. Also, in the can type secondary battery, an electrode assembly is accommodated in a case made of a metal or plastic material having a predetermined shape.

The can type secondary battery is classified into a prismatic type secondary battery in which the case has a polygonal shape and a cylinder type secondary battery in which the battery case has a cylindrical shape according to the shape of the battery case.

FIG. 1 is a partial cross-sectional view of a cylindrical secondary battery 2 according to the related art.

In general, as illustrated in FIG. 1, the cylindrical secondary battery 2 includes a cylindrical battery can 12, a jelly-roll type electrode assembly 13 accommodated in the battery can 12, a cap assembly 11 coupled to an upper portion of the battery can 12, a beading part 14 disposed on a front end of the battery cab 12 to mount the cap assembly 11, and a crimping part 15 for sealing the battery.

The cap assembly 11 has a structure in which a top cap 111 sealing an opening of the battery can 12 and forming a positive electrode terminal, a PTC element 112 that interrupts current by increasing resistance when an internal temperature of the battery increases, a safety vent 113 that interrupts current when an internal pressure of the battery increases due to abnormal current and exhausts an internal gas, a CID gasket 114 electrically separating the safety vent from a CID filter 115 except for a specific portion, and the CID filter 115 to which a positive electrode lead connected to a positive electrode is connected and which interrupts current when a high pressure is generated in the battery.

Also, the cap assembly 11 is installed on a beading part 14 of the battery can 12 in a state of being mounted on a crimping gasket 116. Thus, under normal operation conditions, a positive electrode of the electrode assembly 13 is electrically connected to the top cap 111 via the positive electrode lead 131, the CID filter 115, the safety vent 113, and the PTC element 112.

An insulator 26 is disposed on each of upper and lower ends of the electrode assembly 13. Here, the insulator 26 disposed on the upper end insulates the electrode assembly 13 from the cap assembly 11, and the insulator (not shown) disposed on the lower end insulates the electrode assembly 13 from a bottom part of the battery can 12.

In the lithium secondary battery, crystal structures of a positive electrode and a negative electrode are collapsed due to a side reaction between a surface of the electrode and the electrolyte while the charging/discharging cycle is repeated, and the electrolyte is depleted to reduce the lifetime of the battery. Particularly, the lithium ions are deteriorated in mobility due to the depletion of the electrolyte to cause an increase in internal resistance, resulting in sudden deterioration in performance of the cell. Thus, studies have been actively carried out to extend the service life while reducing the performance degradation of the secondary battery by further injecting an electrolyte into the secondary battery.

However, in the case of the cylindrical secondary battery according to the related art, the insulator is made of a polyolefin resin such as polyethylene or polypropylene, which has insulating property and electrolyte resistance and is excellent in punching processability. Thus, in order to additionally inject the electrolyte, there is a method in which the insulator 26 is detached to the outside after the battery can 12 is physically opened so that the electrolyte is injected by using a syringe to reseal the battery can 12. However, in this method, the internal structure of the battery may be exposed to air to cause the oxidation of the electrode and the degeneration of the electrolyte. Thus, there has been a limitation that additional costs for preventing this phenomenon are required.

DISCLOSURE OF THE INVENTION

Technical Problem

An object of the present invention is to provide a secondary battery in which an electrolyte is easily injected into a battery can, and an internal structure of the battery is not exposed to air to prevent oxidation of an electrode and deterioration of the electrolyte from occurring and an insulator for the secondary battery.

The objects of the present invention are not limited to the aforementioned object, but other objects not described herein will be clearly understood by those skilled in the art from descriptions below.

Technical Solution

To solve the above-described problems, a secondary battery according to an embodiment of the present invention includes: an electrode assembly in which a positive electrode, a negative electrode, and a separator are wound or stacked; an insulator disposed on at least one of an upper portion and a lower portion of the electrode assembly; and a battery case configured to accommodate the electrode assembly, the insulator, and an electrolyte and sealed by a cap assembly, wherein the insulator includes: a peripheral portion having a disk ring shape and made of a rigid material; and a central portion extending inward from an inner circumferential surface of the peripheral portion and made of a textile fabric having high-temperature resistance.

To solve the above-described problems, an insulator of a secondary battery includes: a peripheral portion having a disk ring shape and made of a rigid material; and a central portion extending inward from an inner circumferential surface of the peripheral portion and made of a textile fabric having high-temperature resistance.

Also, the central portion may have a disk shape and share the same central axis as the peripheral portion.

Also, the peripheral portion and the central portion may be integrated with each other.

Also, the peripheral portion and the central portion may be formed through insert-injection molding.

Also, the central portion may be inserted, and the rigid material may be injection-molded to form the peripheral portion.

Also, the rigid material may include a phenolic resin.

Also, the textile fabric having the high-temperature resistance may include a glass fabric.

Also, the peripheral portion may have an inner diameter that corresponds to 50% to 95% of an outer diameter thereof.

Also, the peripheral portion may be formed by stacking a first layer made of the rigid material and a second layer made of the textile fabric having the high-temperature resistance.

Also, the second layer and the central portion may be integrally manufactured to have a disk shape.

To solve the above-described problems, a secondary battery according to an embodiment of the present invention includes: an electrode assembly in which a positive electrode, a negative electrode, and a separator are wound or stacked; an insulator disposed on at least one of an upper portion and a lower portion of the electrode assembly; and a battery case configured to accommodate the electrode assembly, the insulator, and an electrolyte and sealed by a cap assembly, wherein the insulator includes: a peripheral portion formed by stacking a phenolic resin including an inorganic additive on a glass fiber that is a base material, having a disk ring shape, and made of a material including the phenolic resin; and a central portion extending inward from an inner circumferential surface of the peripheral portion and made of a material including the glass fiber, wherein a composition ratio of the glass fiber, the phenolic resin, and the inorganic additive is 55 wt % to 70 wt % of the glass fiber, 25 wt % to 40 wt % of the phenolic resin, and 5 wt % to 20 wt % of the inorganic additive, and the insulator has a thickness of 0.3 mm to 0.65 mm.

Also, the inorganic additive may have a mean particle diameter less than a diameter of the glass fiber.

Also, the inorganic additive may include at least one selected from the group consisting of alumina, silica, aluminum hydroxide, calcium hydroxide, magnesium hydroxide, and calcium carbonate.

Particularities of other embodiments are included in the detailed description and drawings.

Advantageous Effects

The embodiments of the present invention may have at least the following effects.

The central portion of the insulator inserted into the battery can may be made of the glass fiber, and thus, the electrolyte may be easily injected into the battery can by using the syringe.

Also, since it is unnecessary to detach the insulator to the outside, the internal structure of the battery may not be exposed to the air to prevent the oxidation of the electrode and the deterioration of the electrolyte from occurring.

Also, the peripheral portion of the insulator may be made of the phenolic resin to prevent the beading part from being damaged event through the internal pressure of the battery can increases.

The effects of the prevent invention are not limited by the aforementioned description, and thus, more varied effects are involved in this specification.

MODE FOR CARRYING OUT THE INVENTION

Figure 1:
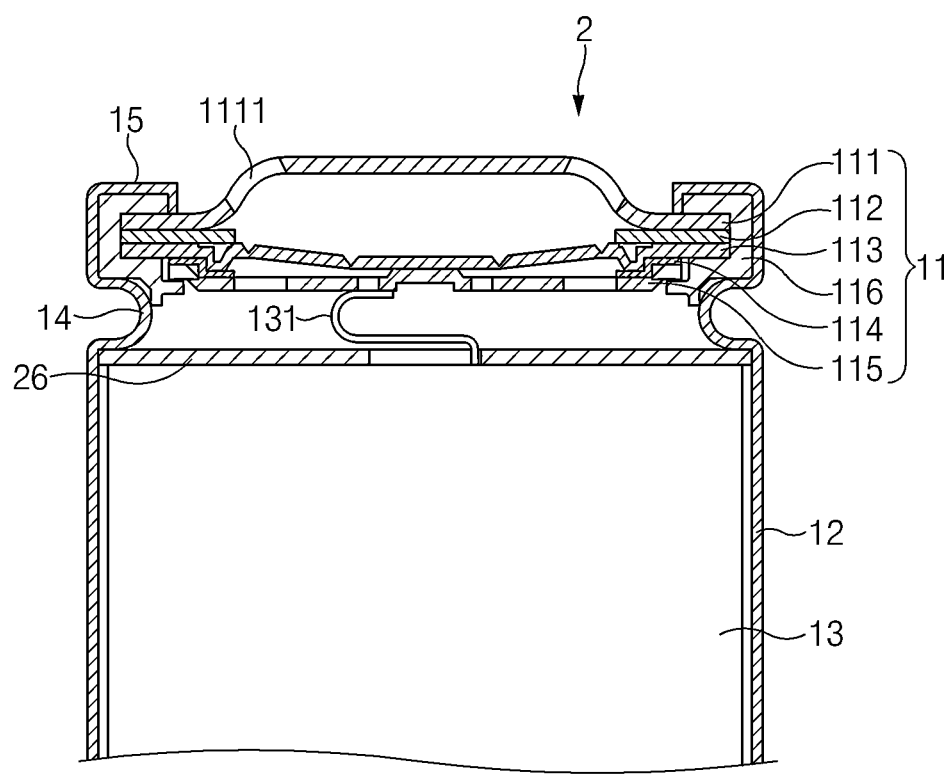
FIG. 1 is a partial cross-sectional view of a cylindrical secondary battery according to a related art.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the inventive concept. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 2:
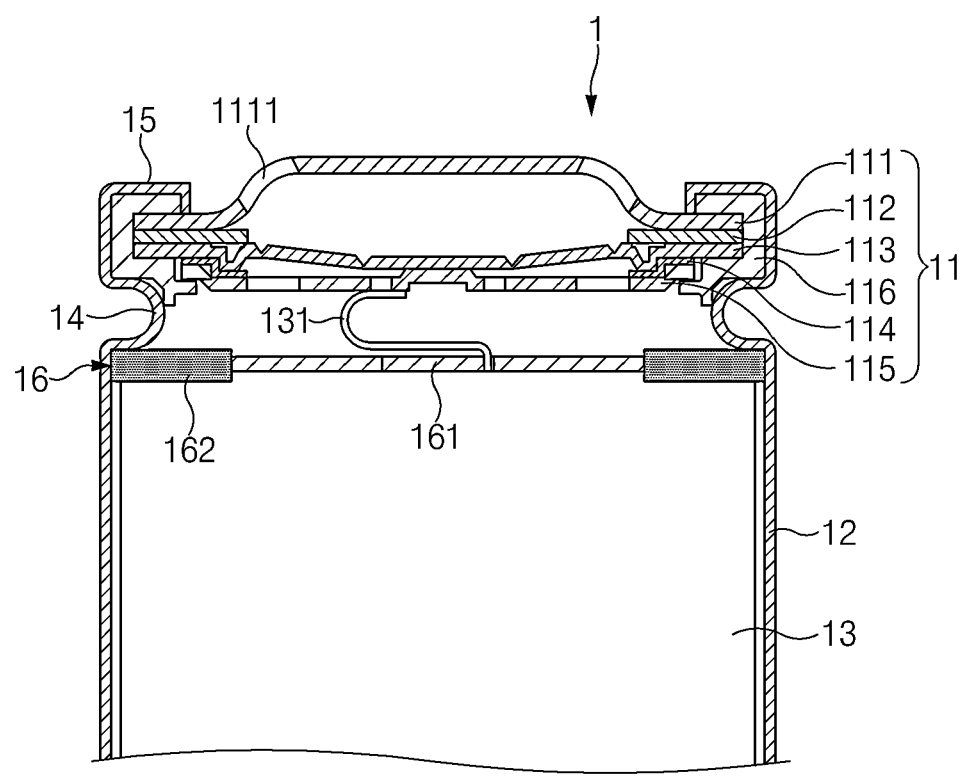
FIG. 2 is a partial cross-sectional view of a cylindrical secondary battery according to an embodiment of the present invention.

FIG. 2 is a partial cross-sectional view of a cylindrical secondary battery 1 according to an embodiment of the present invention.

As illustrated in FIG. 2, the cylindrical secondary battery 1 according to an embodiment of the present invention includes a battery can 12, a jelly-roll type electrode assembly 13 accommodated in the battery can 12, a cap assembly 11 coupled to an upper portion of the battery can 12, a beading part 14 disposed on a front end of the battery cab 12 to mount the cap assembly 11, and a crimping part 15 for sealing the battery. The cylindrical secondary battery 1 may be used as a power source for a mobile phone, a notebook computer, an electric vehicle, and the like, which stably supplies a constant output.

The battery can 12 may be made of a lightweight conductive metal material such as aluminum, nickel, stainless steel, or an alloy thereof. The battery can 12 may have an opened upper portion and a closed bottom portion that is opposite to the upper portion. An electrolyte together with the electrode assembly 13 may be accommodated in an inner space of the battery can 12. Although the battery can 12 has a cylindrical shape, the present invention is not limited thereto. For example, the battery can 12 may have various shape such as a prismatic shape in addition to the cylindrical shape.

The electrode assembly 13 may have a stack structure including two electrode plates such as a positive electrode plate and a negative electrode plate, each of which has a wide plate shape in the form of a roll and a separator disposed between the electrode plates to insulate the electrode plates from each other or disposed on at a left or right side of one electrode plate. The stack structure may have various shapes, for example, may be wound in the form of a jelly roll or be staked in a shape in which the positive electrode plate and the negative electrode plate, each of which has a predetermined size, are stacked with the separator therebetween. Each of the two electrode plates has a structure in which active material slurry is applied to a metal foil or a mesh-shaped collector including aluminum and copper. The slurry may be usually formed by agitating a granular active material, an auxiliary conductor, a binder, and a plasticizer with a solvent added. The solvent may be removed in the subsequent process. A non-coating portion on which the slurry is not applied may be disposed at a starting end and a distal end of the collector in a direction in which the electrode plate is wound. A pair of leads, which respectively correspond to the electrode plates, are attached to the non-coating portion. The positive electrode 131 attached to an upper end of the electrode assembly 13 may be electrically connected to the cap assembly 11, and the negative electrode (not shown) attached to a lower end of the electrode assembly 13 may be connected to a bottom surface 12 of the battery can 12. However, the present invention is not limited thereto. For example, all the positive electrode 131 and the negative electrode may be withdrawn in a direction of the cap assembly 11.

An insulator 16 is disposed on each of the upper and lower ends of the electrode assembly 13. Here, the insulator 26 disposed on the upper end insulates the electrode assembly 13 from the cap assembly 11, and the insulator (not shown) disposed on the lower end insulates the electrode assembly 13 from a bottom part of the battery can 12. The insulator 16 according to an embodiment of the present invention will be described later.

A center pin (not shown) that prevents the electrode assembly 13 wound in the form of the jelly roll from being unwound and serves as a moving path of a gas within the secondary battery 1 may be inserted into a center of the battery can 12.

The electrolyte filled into the battery can 12 may move lithium ions generated by electrochemical reaction of the electrode plates during charging and discharging of the secondary battery 1. The electrolyte may include a non-aqueous organic electrolyte that is a mixture of a lithium salt and a high-purity organic solvent or a polymer using a polymer electrolyte.

The cap assembly 11 may be coupled to an opening formed in the upper end of the battery can 12 to seal the opening of the battery cab 12. The cap assembly 11 may have various shapes such as a circular shape or a prismatic shape according to the shape of the battery can 12. According to an embodiment, the battery can 12 has the cylindrical shape. In this case, the cap assembly 11 may also have a disk shape corresponding to the shape of the battery can 12.

According to an embodiment of the present invention, the cap assembly 11 may have a structure in which a top cap 111 sealing the opening of the battery can 12 and forming the positive electrode terminal, a safety vent 113 that interrupts current when an internal pressure of the battery increases due to abnormal current and exhausts a gas within the battery, and a current interrupt device to which a positive lead 131 connected to the positive electrode of the electrode assembly 13 is connected and which interrupts current when a high pressure occurs in the battery are sequentially stacked. Also, the cap assembly 11 is installed on a beading part 14 of the battery can 12 in a state of being mounted on a crimping gasket 116. Thus, under normal operation conditions, a positive electrode of the electrode assembly 13 is electrically connected to the top cap 111 via the positive electrode lead 131, the current interrupt device, the safety vent 113, and the PTC element 112.

The top cap 111 is disposed on the uppermost portion of the cap assembly 11 in a shape protruding upward to form the positive electrode. Thus, the top cap 111 may be electrically connected to a load or an external device such as a charging device. A gas hole 1111 through which the gas generated in the secondary battery 1 is discharged may be formed in the top cap 111. Thus, when the internal pressure increases due to the generation of the gas from the electrode assembly 13 due to overcharging or the like, a CID filter 115 of the current interrupt device and the safety vent 113 may be ruptured, and thus, the internal gas may be discharged to the outside through the ruptured portion and the gas hole 1111. Thus, the charging and discharging are not performed any more to secure safety of the secondary battery 1. The top cap 111 may be made of a metal material such as stainless steel or aluminum.

A portion of the top cap 111 contacting the safety vent 113 may not be specifically limited in thickness as long as the portion of the tap cap 111 protects various components of the cap assembly 11 from a pressure applied from the outside, i.e., may have a thickness of 0.3 mm to 0.5 mm. When the thickness of the portion of the top cap 111 is too thin, it may be difficult to exhibit mechanical rigidity. On the other hand, when the thickness of the portion of the top cap 111 is too thick, capacity of the battery may be reduced due to an increase in size and weight when compared to the same standard.

The safety vent 113 may serve for interrupting the current when the internal pressure of the battery increases due to the abnormal current or exhausting the gas and may be made of a metal material. The thickness of the safety vent 113 may vary according to a material, a structure, and the like thereof. That is, the thickness of the safety vent 113 is not specifically limited as long as the safety vent 113 discharges the gas while being ruptured when a predetermined high pressure is generated in the battery. For example, the safety vent 113 may have a thickness of 0.2 mm to 0.6 mm.

The current interrupt device (CID) may be disposed between the safety vent 113 and the electrode assembly 13 to electrically connect the electrode assembly 13 to the safety vent 113. The current interrupt device includes a CID filter 115 contacting the safety vent 113 to transmit the current and a CID gasket 114 spatially separating and isolating the CID filter 115 and the safety vent 113 from each other.

Thus, the current generated from the electrode assembly 13 flows into the safety vent 113 via the positive lead 131 and the CID filter 115 in a normal state so that the secondary battery is discharged. However, when the internal pressure of the secondary battery 1 increases due to the abnormal current, the internal pressure of the battery may increase by the gas generated in the secondary battery 1 due to the abnormal current. Thus, the connection between the safety vent 113 and the CID filer 114 may be interrupted, or the CID filter may be ruptured. Therefore, the electrical connection between the safety vent 113 and the electrode assembly 13 may be interrupted to secure the safety.

The cap assembly 11 may further include a positive temperature coefficient (PTC) element 112 between the safety vent 113 and the top cap 111. The PTC element 112 may increase in battery resistance when the internal temperature increases to interrupt the current the current. That is, the PTC element 112 electrically connects the top cap 11 to the safety vent 113 in the normal state. However, in the abnormal state, for example, when the temperature abnormally increases, the PTC element 112 interrupts the electrical connection between the top cap 111 and the safety vent 113. The PTC element 112 may also vary in thickness according to the material, the structure, and the like thereof, for example, may have a thickness of 0.2 mm to 0.4 mm. When the PCT element 112 has a thickness greater than 0.4 mm, the internal resistance may increase, and also, the battery may increase in size to reduce the battery capacity when compared to the same standard. On the other hand, when the PTC element 112 has a thickness less than 0.2 mm, it may be difficult to exhibit the current interrupt effect at a high temperature, and the PCT element 112 may be destroyed by a weak external impact. Thus, the thickness of the PCT element 112 may be appropriately determined within the above-described thickness range in consideration of these points in combination.

Even when the secondary battery 1 including the above-described cap assembly 11 is used as a power source for a power tool such as an electric drill, the secondary battery 1 may instantaneously provide an high output and be stable against an external physical impact such as vibration and dropping.

The beading part 14 bent inward from the outside may be formed on the upper portion of the battery can 12. The beading part 14 may allow the cap assembly 11, on which the tap cap 111, the PTC element 112, the safety vent 113, and the current interrupt device are stacked, to be disposed on an upper end of the battery can 12, thereby preventing the electrode assembly 13 from moving vertically.

As described above, the cap assembly 11 is installed on the beading part 14 of the battery can 12 in the state of being mounted on the crimping gasket 116. The crimping gasket 116 may have a cylindrical shape with both opened ends. As illustrated in FIG. 2, one end of the battery can 12, which faces the inside of the battery case 12, may be primarily bent substantially vertically toward a central axis and then secondarily bent vertically toward the inside of the battery can 12 and be seated on the beading part 14. Also, the crimping gasket 116 has the other end that initially extends in a direction parallel to the central axis. However, when a process of coupling the cap assembly 11 and pressing an outer wall of an upper end of the battery can 12 to form a crimping part 15 is performed later, the crimping gasket 116 may be bent in a direction that is substantially vertical along the shape of the crimping part 15 to proceed to the central axis. Thus, the crimping gasket 116 has an inner circumferential surface that is closely attached to the cap assembly 111 and an outer circumferential surface that is closely attached to an inner circumferential surface of the battery can 12.

Figure 3:
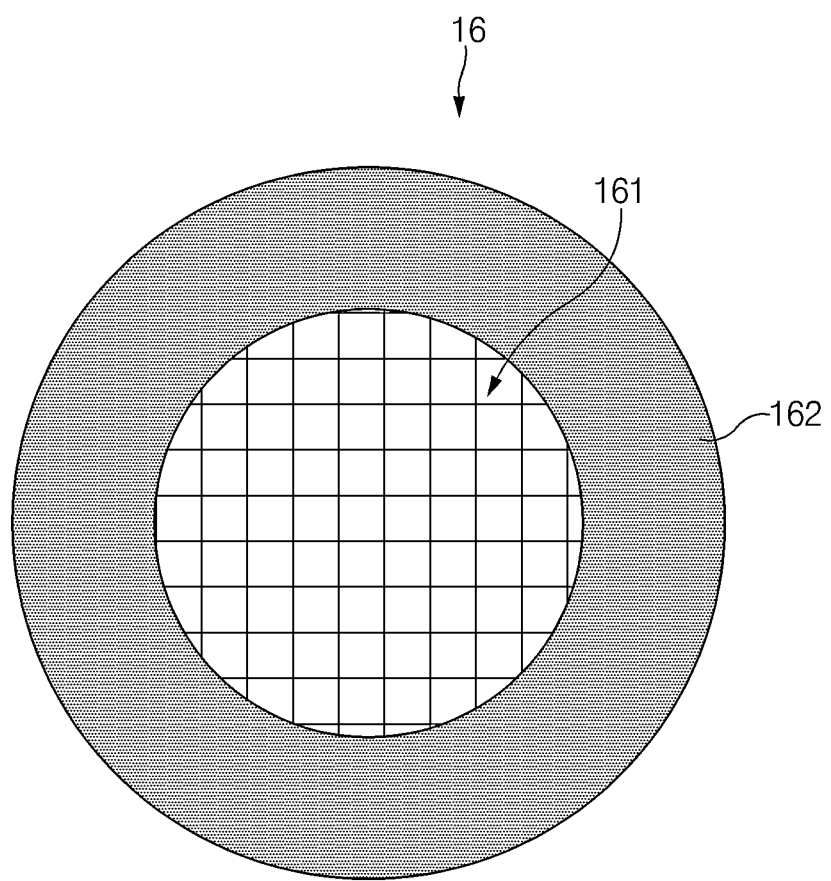
FIG. 3 is a plan view of an insulator according to an embodiment of the present invention.

FIG. 3 is a plan view illustrating the insulator 16 according to an embodiment of the present invention.

As illustrated in FIG. 3, the insulator 16 device according to an embodiment of the present invention has a disk shape and includes a central portion 161 and a peripheral portion 162.

The central portion 161 has a disk shape and is made of a material including a textile fabric having high-temperature resistance. Particularly, the central portion 161 may be made of a material including a glass fiber. The glass fiber is manufactured in a long fiber shape by melting glass in a platinum furnace and drawing the melted glass through a small-diameter hole. The glass fiber may have excellent in heat resistance, durability, sound-absorbing properties, electric insulation, rust-proof, and easy processability and thus be mainly used for building insulation materials, air filtering materials, electric insulating materials, and the like. Thus, the central portion 161 of the insulator 16 according to an embodiment of the present invention is formed by punching textile fabrics in which glass fibers cross each other with a weft yarn and a warp yarn. Thus, the insulator 16 may be excellent in heat resistance and insulation, and a sharp syringe may be easily penetrated between the tissues of the glass fibers. Therefore, the electrolyte may be easily injected.

Furthermore, according to an embodiment of the present invention, the glass fiber may have a diameter of about 4 μm to about 15 μm.

The peripheral portion 162 may have disk ring shape and be made of a rigid material. Particularly, the peripheral portion 162 may be made of a material inducing a phenolic resin.

The phenolic resin is a thermosetting synthetic resin formed by condensation of phenols (phenol, cresol, xylenol, resorcinol, etc.) with aldehydes (formaldehyde, acetaldehyde, furfural, etc.). The phenolic resin has excellent heat resistance, water resistance, chemical resistance, and heat resistance and is mainly used as an electric insulating material, an adhesive, and the like. Thus, the peripheral portion 162 of the insulator 16 according to an embodiment of the present invention may be made of the phenolic resin and thus be excellent in heat resistance and conductivity. Also, the peripheral portion 162 may have the thermosetting property to prevent the insulator 16 from being nonuniform in thickness or deformed even though the temperature increases. In addition, the peripheral portion 162 may reinforce strength of the beading part 14 at which the battery can 12 has weak strength even through the internal pressure of the battery can 12 increases.

An inorganic additive may be added to the phenolic resin. Thus, the phenolic resin may be more effectively prevented from being contracted or deformed when the phenolic resin is heated. The inorganic additive may have a mean particle diameter less than a diameter of the strand of the glass fiber. Thus, as the molten phenolic resin is curved when the peripheral portion 162 is manufactured, the added inorganic additive is not resisted by the glass fiber. As a result, the peripheral portion 162 may have a uniform thickness and a flat surface. The inorganic additive may include at least one of alumina, silica, aluminum hydroxide, calcium hydroxide, magnesium hydroxide, and calcium carbonate.

In the insulator 16 manufactured as described above, a composition ratio of the glass fiber, the phenolic resin, and the inorganic additive may be 55 wt % to 70 wt % of the glass fiber, 25 wt % to 40 wt % of the phenolic resin, and 5 wt % to 20 wt % of the inorganic additive.

The insulator described so far may be not only an upper insulator 16 disposed on the upper portion of the electrode assembly but also a lower insulator 16 disposed on the lower portion of the electrode assembly. However, the present invention is not limited thereto. For example, the upper insulator 16 may be the above-described insulator 16, and the lower insulator 16 may be formed of a polyolefin resin such as polyethylene or polypropylene, which is conventionally used because of its excellent electrolytic solution resistance and excellent punching processability.

Figure 4:
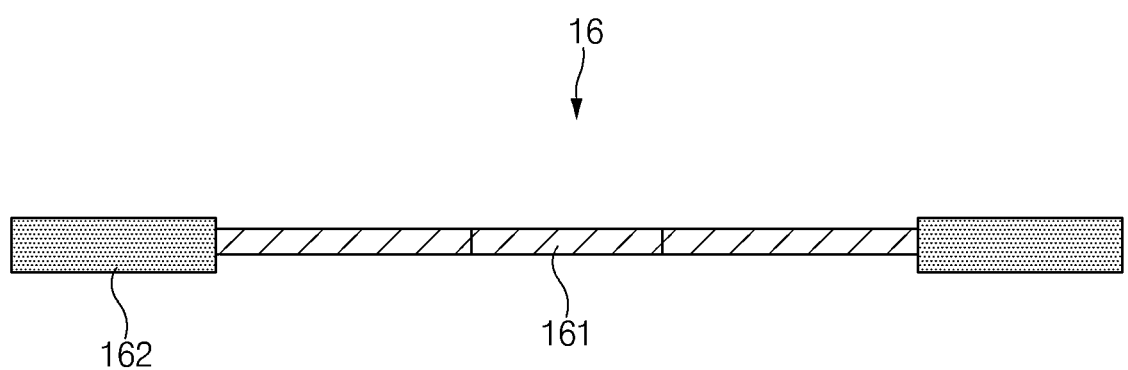
FIG. 4 is a side view of the insulator according to an embodiment of the present invention.

FIG. 4 is a side view of the insulator 16 according to an embodiment of the inventive concept.

As illustrated in FIG. 4, the insulator 16 according to an embodiment of the present invention includes the peripheral portion 162 and the central portion 161. The peripheral portion 162 and the central portion may be integrated with each other. Also, the peripheral portion 162 is formed to extend from an outer circumferential surface of the central portion in a radial direction and thus does not increase in thickness.

The peripheral portion 162 is made of a rigid material to reinforce the strength of the beading part 14 of the battery can 12. The peripheral portion 162 may have flat top and bottom surfaces. Also, the peripheral portion 162 may have the disk ring shape, and a hole may be punched in a center of the peripheral portion 162. Also, the central portion 161 extending inward is formed on an inner circumferential surface of the punched hole. The peripheral portion 162 may have a thickness, for example, of 0.3 mm to 0.65 mm, but the present invention is not limited thereto. For example, the peripheral portion 162 may have various thicknesses according to the material, the structure, and the like thereof.

The central portion 161 may extend to the inside of the peripheral portion 162, i.e., extend from the inner circumferential surface of the punched hole in the radial direction. Thus, the central portion 161 may have a disk shape. Also, the central portion 161 may share the same central axis as the peripheral portion 162.

The peripheral portion 162 and the central portion 161 may be molded through insert-injection and be integrated with each other. That is, a textile fabric made of glass fibers may be punched to be inserted into an insert, and the phenolic resin that becomes the peripheral portion 162 may be melted through casting and then inject-molded. If the peripheral portion 162 and the central portion 161 are easily separated from each other, the electrolyte may leak through a gap between the peripheral portion 162 and the central portion 161. Also, since the insulation is not provided, the positive electrode and the negative electrode may contact each other to cause short-circuit. Thus, like the insulator 16 according to an embodiment of the present invention, the peripheral portion 162 and the central portion 161 may be integrated with each other to maintain the insulation and prevent the short-circuit from occurring. However, the present invention is not limited thereto. For example, the peripheral portion 162 and the central portion 161 may be molded in various methods as long as the peripheral portion 162 and the central portion 161 are integrated with each other.

The diameter of the central portion 161 may be preferably 50% to 95% of an outer diameter of the peripheral portion 162. Thus, even though the internal pressure of the battery can 12 increases, the beading part 14 may be prevented from being damaged while the additional injection of the electrolyte is easy. Also, the central portion 161 may have a diameter corresponding to an inner diameter of the peripheral portion 162. Here, the correspondence to the inner diameter of the peripheral portion 162 may mean that a difference is within a range of offset even if the same or a certain difference exists. Thus, the central portion 161 may integrated with the peripheral portion 162 and may not be easily separated from the peripheral portion 162.

As described above, the central portion 161 may be made of the glass fiber. Thus, the sharp syringe may be easily penetrated between the tissues of the glass fiber so that the electrolyte is easily injected. Thus, the central portion 161 may have a thickness less than that of the peripheral portion 162. For example, the central portion 161 may have a thickness of 0.01 mm to 0.2 mm. However, the present invention is not limited thereto. That is, the central portion 161 may have various thicknesses, for example, may have the same thickness as the peripheral portion 162.

As described above, according to an embodiment of the present invention, the central portion 161 may extend to the inside of the peripheral portion 162. That is, the peripheral portion 162 is formed to extend from the outer circumferential surface of the central portion in a radial direction. Here, the peripheral portion 162 and the central portion 161 may be disposed on the same plane. That is, a top surface of the peripheral portion 162 and a top surface of the central portion 161 may be disposed on the same plane, or a bottom surface of the peripheral portion 162 and a bottom surface of the central portion 161 may be disposed on the same plane. However, the present invention is not limited thereto. For example, since the central portion 161 has a thickness less than that of the peripheral portion 162, as illustrated in FIG. 4, the top surface of the central portion 161 may be disposed below the top surface of the peripheral portion 162, and the bottom surface of the central portion 161 may be disposed above the bottom surface of the peripheral portion 162.

Figure 5:
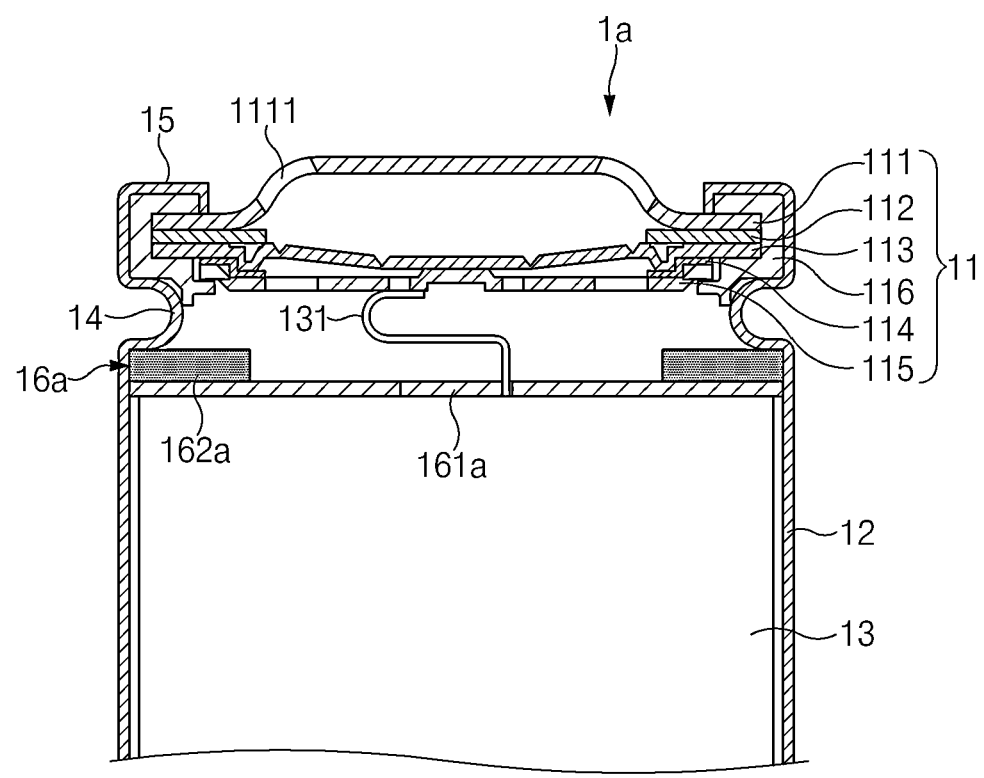
FIG. 5 is a partial cross-sectional view of a cylindrical secondary battery according to another embodiment of the present invention.
Figure 6:
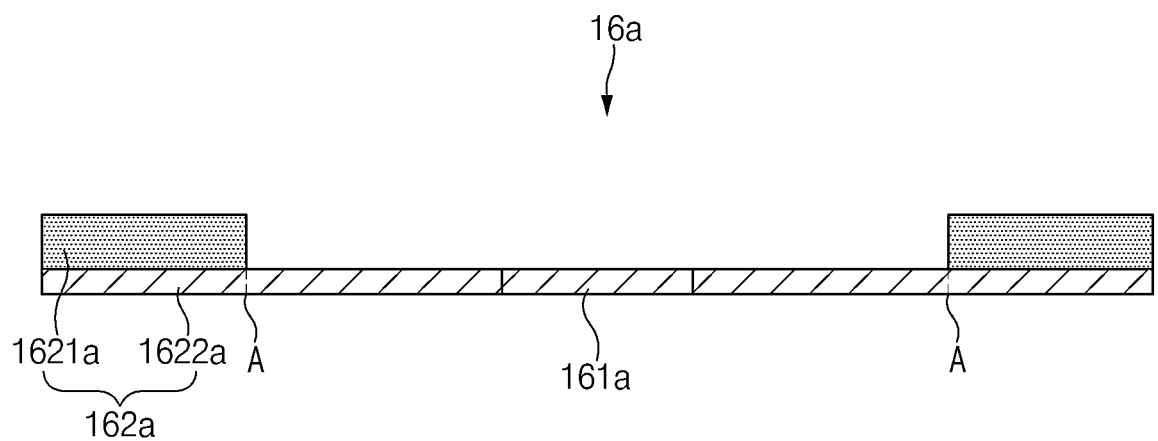
FIG. 6 is a side view of an insulator according to another embodiment of the present invention.

FIG. 5 is a partial cross-sectional view of a cylindrical secondary battery according to another embodiment of the present invention, and FIG. 6 is a side view of an insulator according to another embodiment of the present invention.

Although the insulator 16 according to the foregoing embodiment of the present invention includes the peripheral portion 162 that is provided as a single layer, an insulator 16a according to another embodiment of the present invention may include a peripheral portion 162a in which a plurality of layers are stacked as illustrated in FIGS. 5 and 6. Hereinafter, in descriptions of the insulator 16a according to another embodiment of the present invention, description of the same contents as those of the insulator 16 according to the foregoing embodiment of the present invention will be omitted. However, this is for convenience of description and is not intended to limit the scope of rights.

A first layer 1621a may be made of a rigid material, particularly, a material including a phenolic resin. That is, the first layer 1621a of a peripheral portion 162a according to another embodiment of the present invention may be made of the same material as the peripheral portion 162 according to the foregoing embodiment of the present invention. Thus, an inorganic additive may further be added to the first layer 1621a of the peripheral portion 162a. The inorganic additive may include at least one of alumina, silica, aluminum hydroxide, calcium hydroxide, magnesium hydroxide, and calcium carbonate. Also, the inorganic additive may have a mean particle diameter less than a diameter of a strand of a glass fiber.

The second layer 1622a may be made of a textile fabric having a high-resistant textile fabric, particularly, a textile fabric made of glass fibers. That is, the second layer 1622a of the peripheral portion 162a may be made of the same material as a central portion 161a. The second layer 1622a of the peripheral portion 162a and the center portion 161a may be integrally manufactured from the beginning and then separated based on a virtual boundary A therebetween. However, the present invention is not limited thereto. The second layer 1622a of the peripheral portion 162a and the center portion 161a may be formed in various methods. For example, the second layer 1622a of the peripheral portion 162a and the center portion 161a may be physically separated from each other or may be separately manufactured and then coupled to each other.

As illustrated in FIGS. 5 and 6, a first layer 1621a may be stacked on an upper portion of the second layer 1522a. Thus, the first layer 1621a may support a beading part 14 of a battery can 12 to reinforce strength of the beading part 14. However, the present invention is not limited thereto. For example, the second layer 1622a may be stacked on an upper portion of the first layer 1621a. Furthermore, a third layer made of a predetermined material may be further stacked. The third layer may be the lowermost layer or the uppermost layer and be stacked between the first layer 1621a and the second layer 1622a.

In the insulator 16a manufactured as described above, a composition ratio of the glass fiber, the phenolic resin, and the inorganic additive may be 55 wt % to 70 wt % of the glass fiber, 25 wt % to 40 wt % of the phenolic resin, and 5 wt % to 20 wt % of the inorganic additive. Also, the insulator 16a may have a thickness, for example, of 0.3 mm to 0.65 mm, but the present invention is not limited thereto. For example, the insulator 16a may have various thicknesses according to a material, a structure, and the like thereof. The peripheral portion 162a and the central portion 161a of the insulating plate 16a may be formed in various methods such as insert injection molding, compression molding, and transfer molding.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A secondary battery comprising:
    an electrode assembly in which a positive electrode, a negative electrode, and a separator are wound or stacked;
    an insulator on at least one of an upper portion and a lower portion of the electrode assembly; and
    a battery case configured to accommodate the electrode assembly, the insulator, and an electrolyte and sealed by a cap assembly,
    wherein the insulator comprises:
        a peripheral portion having a disk ring shape with an outer circumferential surface of a first circle and an inner circumferential surface of a second circle, the peripheral portion being made of a rigid material; and
        a central portion in contact with and extending inward from the inner circumferential surface of the peripheral portion and including a textile fabric of glass fibers crossing each other with a weft and a warp such that the textile fabric extends over an entire region within the inner circumferential surface,
    wherein the peripheral portion is formed by stacking a first layer including the rigid material and a second layer including the textile fabric, and
    wherein the peripheral portion has an inner diameter that corresponds to 50% to 95% of an outer diameter thereof.

2. An insulator of a secondary battery, the insulator comprising:
    a peripheral portion having a disk ring shape with an outer circumferential surface of a first circle and an inner circumferential surface of a second circle, the peripheral portion including a rigid material; and
    a central portion in contact with and extending inward from the inner circumferential surface of the peripheral portion and including a textile fabric of glass fibers crossing each other with a weft and a warp such that the textile fabric extends over an entire region within the inner circumferential surface, wherein the peripheral portion has an inner diameter that corresponds to 50% to 95% of an outer diameter thereof.

3. The insulator of claim 2, wherein the central portion has a disk shape with a circular periphery, and the central portion and the peripheral portion are concentric.

4. The insulator of claim 2, wherein the peripheral portion and the central portion are integrated with each other.

5. The insulator of claim 4, wherein the peripheral portion and the central portion are formed through insert-injection molding.

6. The insulator of claim 5, wherein the central portion is inserted, and the rigid material is injection-molded to form the peripheral portion.

7. The insulator of claim 2, wherein the rigid material comprises a phenolic resin.

8. The insulator of claim 2, wherein the peripheral portion is formed by stacking a first layer including the rigid material and a second layer including the textile fabric.

9. The insulator of claim 8, wherein the second layer and the central portion are integrally manufactured to have a disk shape.

10. A secondary battery comprising:
an electrode assembly in which a positive electrode, a negative electrode, and a separator are wound or stacked;
an insulator on at least one of an upper portion and a lower portion of the electrode assembly; and
a battery case configured to accommodate the electrode assembly, the insulator, and an electrolyte and sealed by a cap assembly,
wherein the insulator comprises:
a peripheral portion including a phenolic resin, which comprises an inorganic additive, stacked on a glass fiber that is a base material, the peripheral portion having a disk ring shape with an outer circumferential surface of a first circle and an inner circumferential surface of a second circle, and including a material comprising the phenolic resin; and
a central portion in contact with and extending inward from the inner circumferential surface of the peripheral portion and including a material comprising the glass fiber,
wherein the glass fiber includes fibers crossing each other with a weft and a warp such that the glass fibers extend over an entire region within the inner circumferential surface,
wherein a composition ratio of the glass fiber, the phenolic resin, and the inorganic additive is 55 wt % to 70 wt % of the glass fiber, 25 wt % to 40 wt % of the phenolic resin, and 5 wt % to 20 wt % of the inorganic additive,
wherein the insulator has a thickness of 0.3 mm to 0.65 mm, and
wherein the peripheral portion has an inner diameter that corresponds to 50% to 95% of an outer diameter thereof.

11. The secondary battery of claim 10, wherein the inorganic additive has a mean particle diameter less than a diameter of the glass fiber.

12. The secondary battery of claim 10, wherein the inorganic additive comprises at least one selected from the group consisting of alumina, silica, aluminum hydroxide, calcium hydroxide, magnesium hydroxide, and calcium carbonate.

* * * * *